(12) United States Patent
Larsson et al.

(10) Patent No.: US 10,412,708 B2
(45) Date of Patent: Sep. 10, 2019

(54) DEVICE AND METHOD FOR WCDMA UPLINK TRANSMISSIONS

(75) Inventors: Erik Larsson, Uppsala (SE); Johan Bergman, Stockholm (SE); Bo Göransson, Sollentuna (SE); Johan Hultell, Solna (SE); Niklas Johansson, Uppsala (SE); Fredrik Ovesjö, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 731 days.

(21) Appl. No.: 13/202,670

(22) PCT Filed: Aug. 19, 2011

(86) PCT No.: PCT/SE2011/051000
§ 371 (c)(1),
(2), (4) Date: Feb. 11, 2013

(87) PCT Pub. No.: WO2012/026869
PCT Pub. Date: Mar. 1, 2012

(65) Prior Publication Data
US 2013/0142174 A1 Jun. 6, 2013

Related U.S. Application Data

(60) Provisional application No. 61/376,085, filed on Aug. 23, 2010.

(51) Int. Cl.
*H04W 72/04* (2009.01)
*H04B 7/0426* (2017.01)
(Continued)

(52) U.S. Cl.
CPC ......... *H04W 72/04* (2013.01); *H04B 7/0434* (2013.01); *H04B 7/0619* (2013.01);
(Continued)

(58) Field of Classification Search
CPC ............................. H04W 72/04; H04W 52/04
See application file for complete search history.

(56) References Cited

U.S. PATENT DOCUMENTS 6,816,717 B1 * 11/2004 Sipila ................... H04B 17/336
455/277.2
7,408,975 B2 * 8/2008 Bar-Ness ........... H04B 1/71072
375/141
(Continued)

FOREIGN PATENT DOCUMENTS

WO    WO 2009099271 A1 * 8/2009 ........... H04L 1/0029
WO    2010/107699 A2    9/2010

OTHER PUBLICATIONS

Patachaianand et al titled "System-Level Modeling and Simulation of Uplink WCDMA", (Patachaianand hereinafter) was published as Information Technology: New Generations, 2008. ITNG 2008. Fifth International Conference on, vol., No., pp. 1071-1076, Apr. 7-9, 2008 doi: 10.1109/ITNG.2008.165.*

(Continued)

*Primary Examiner* — Zhiren Qin
(74) *Attorney, Agent, or Firm* — Sage Patent Group

(57) ABSTRACT

A NodeB for a WCDMA system, arranged to transmit instructions to a UE for the UE's uplink transmissions. The NodeB is arranged to transmit the instructions on a dedicated downlink physical channel which the NodeB is arranged to use for transmissions to a plurality of UEs and which comprises a plurality of radio frames, where each radio frame comprises a number of slots and each slot comprises a number of WCDMA symbols. The instructions to the UE comprise Transmit Power Commands as well as other instructions to the UE for the UE's uplink transmissions. The NodeB is arranged to use a first WCDMA slot (Continued)

format for the TPC commands to the UE and a second WCDMA slot format for the other instructions to the UE.

21 Claims, 11 Drawing Sheets

(51) Int. Cl.
    *H04B 7/06* (2006.01)
    *H04W 52/14* (2009.01)
    *H04W 52/54* (2009.01)
    *H04W 52/04* (2009.01)
(52) U.S. Cl.
    CPC ......... *H04W 52/04* (2013.01); *H04W 52/146* (2013.01); *H04W 52/54* (2013.01); *H04W 72/042* (2013.01)

(56) References Cited

U.S. PATENT DOCUMENTS

| | | | | |
|---|---|---|---|---|
| 7,555,068 B2* | 6/2009 | Dabak | ...................... | H04L 1/06 375/260 |
| 7,593,729 B2* | 9/2009 | Barak | .................. | H04B 7/0408 235/380 |
| 7,620,370 B2* | 11/2009 | Barak | .................. | H04W 16/10 370/480 |
| 7,630,732 B2* | 12/2009 | Pan | ...................... | H01Q 3/2605 455/126 |
| 7,715,488 B2* | 5/2010 | Pedersen et al. | ............. | 375/267 |
| 7,916,745 B2* | 3/2011 | De Carvalho | ....... | H04B 7/0623 370/437 |
| 7,933,560 B2* | 4/2011 | Han | ..................... | H04B 7/0626 455/69 |
| 8,355,351 B2* | 1/2013 | Yang | ................... | H04B 7/0404 370/280 |
| 8,355,424 B2* | 1/2013 | Xi | ....................... | H04B 7/0617 375/144 |
| 8,611,941 B2* | 12/2013 | Sidi et al. | ..................... | 455/522 |
| 8,625,693 B2* | 1/2014 | Tsai | ..................... | H04B 7/0617 375/267 |
| 8,649,455 B2* | 2/2014 | Clerckx | .............. | H04L 25/0224 375/260 |
| 8,654,715 B2* | 2/2014 | Wang et al. | .................. | 370/329 |
| 8,654,820 B2* | 2/2014 | Hoshino | .............. | H04B 7/0408 375/219 |
| 2002/0086682 A1* | 7/2002 | Naghian | ........................ | 455/456 |
| 2003/0095529 A1* | 5/2003 | Petre | ................... | H04B 1/7105 370/342 |
| 2003/0202499 A1* | 10/2003 | Thron | .................. | H04L 1/0002 370/342 |
| 2005/0018646 A1* | 1/2005 | Sriram | ............... | H04B 1/70735 370/350 |
| 2005/0250524 A1* | 11/2005 | Nilsson | ............... | H04W 52/221 455/509 |
| 2006/0014487 A1* | 1/2006 | Jonsson | ............... | H04B 1/7097 455/1 |
| 2006/0094373 A1* | 5/2006 | Hottinen | ............. | H04B 7/0417 455/73 |
| 2007/0002963 A1* | 1/2007 | Pedersen | .............. | H04B 7/0634 375/267 |
| 2009/0034502 A1* | 2/2009 | Kostic | .................. | H04B 1/7115 370/342 |
| 2009/0080546 A1* | 3/2009 | Zhao | .................... | H04B 7/0626 375/260 |
| 2009/0197630 A1* | 8/2009 | Ahn | ....................... | H04L 1/0029 455/522 |
| 2009/0310587 A1* | 12/2009 | Hammar | ................ | H04B 1/707 370/342 |
| 2009/0316674 A1* | 12/2009 | Wang | ................... | H04B 1/7105 370/342 |
| 2010/0002670 A1* | 1/2010 | Dent | ................... | H04J 13/0077 370/342 |
| 2010/0004015 A1* | 1/2010 | Nilsson | ................ | H04L 1/0025 455/522 |
| 2010/0041429 A1* | 2/2010 | Sidi et al. | ...................... | 455/522 |
| 2010/0074220 A1* | 3/2010 | Jung et al. | ..................... | 370/331 |
| 2010/0103877 A1* | 4/2010 | Wang | .................... | H04B 7/061 370/328 |
| 2010/0124206 A1* | 5/2010 | Bottomley | ............. | H04B 1/707 370/336 |
| 2011/0080972 A1* | 4/2011 | Xi | ....................... | H04B 7/0617 375/267 |

OTHER PUBLICATIONS

3GPP TS 25.211, titled "Technical Specification Group Radio Access Network, Physical Channels and mapping of transport channels onto physical channels (FDD); V9.1.0, Release 9," (3GPP 25211 hereinafter) was published as Technical Specification by 3rd Generation Partnership Project on Dec. 2009, pp. 01 through 58.*
3GPP TS 25.211, "3rd Generation Partnership Project; Technical Specification Group Radio Access Network; Physical channels and mapping of transport channels onto physical channels (FDD) (Release 7)," V7.9.0, Dec. 2009.
International Search Report dated Oct. 31, 2011 in International Application No. PCT/SE2011/051000.
Written Opinion dated Oct. 31, 2011 in International Application No. PCT/SE2011/051000.

* cited by examiner

| UE1 | UE1 | UE4 | UE4 | UE7 | UE5 | UE6 | UE3 | UE2 |
|---|---|---|---|---|---|---|---|---|

$t=t_0$

| UE1 | UE1 | UE4 | UE4 | UE7 | UE7 | UE8 | UE8 | UE6 | UE3 |
|---|---|---|---|---|---|---|---|---|---|

$t=t_0+\Delta$

Fig. 6

| Slot Format #i | Channel Bit Rate (kbps) | Symbol Rate (ksps) | SF | Bits/Slot | $N_{OFF1}$ Bits/Slot | $N_{TPC}$ Bits/Slot | $N_{OFF2}$ Bits/Slot |
|---|---|---|---|---|---|---|---|
| 0 | 3 | 1.5 | 256 | 20 | 2 | 2 | 16 |
| 1 | 8 | 1.5 | 256 | 20 | 4 | 2 | 14 |
| 2 | 3 | 1.5 | 256 | 20 | 6 | 2 | 12 |
| 3 | 3 | 1.5 | 256 | 20 | 8 | 2 | 10 |
| 4 | 3 | 1.5 | 256 | 20 | 10 | 2 | 8 |
| 5 | 3 | 1.5 | 256 | 20 | 12 | 2 | 6 |
| 6 | 3 | 1.5 | 256 | 20 | 14 | 2 | 4 |
| 7 | 3 | 1.5 | 256 | 20 | 16 | 2 | 2 |
| 8 | 3 | 1.5 | 256 | 20 | 18 | 2 | 0 |
| 9 | 3 | 1.5 | 256 | 20 | 0 | 2 | 18 |

FIG. 7

DEVICE AND METHOD FOR WCDMA UPLINK TRANSMISSIONS

This application is the U.S. national phase of International Application No. PCT/SE2011/051000 filed 19 Aug. 2011 which designated the U.S. and claims priority to U.S. Provisional Application No. 61/376,085 filed 23 Aug. 2010, the entire contents of each of which are hereby incorporated by reference.

TECHNICAL FIELD

The present invention discloses devices and methods for instructions for uplink transmission in a WCDMA system.

BACKGROUND

In so called closed loop WCDMA systems, instructions to a UE regarding the UE's uplink transmission are transmitted to the UE from the NodeB, although the instructions may in some cases originate from the RNC.

The instructions for uplink transmissions may relate to, for example, the number of streams to be used in uplink MIMO transmissions or uplink beam forming transmissions. The beam forming case will be described briefly below, which is for the sake of clarity only, and is not intended to exclude the MIMO case.

Beam forming in transmissions from a UE can be seen as multiplying the transmit signal at each antenna or antenna port (a notion which will be explained in more detail later in this text) with a certain weight factor, where the weight factor can be either complex or non-complex. For a UE with more than one antenna or antenna port, this can be seen as a pre-coding vector comprising the pre-coding factors to be used by the UE, where the size of the pre-coding vector corresponds to the number of antennas or antenna ports.

In closed-loop beam forming, the desired pre-coding vector is determined by the NodeB and then signaled to the UE. Usually, a pre-coding vector is signaled to a UE by means of signaling a code word from a code book which comprises a number of such code words, where each code word corresponds to a certain pre-coding vector in the code book.

With such downlink signaling to the UE, it will be realized that in general, there will be a trade-off between signalling overhead and UE performance. The higher granularity that is available for the pre-coding weights (i.e. the larger the codebook), the more efficiently the NodeB can adapt to the effective channel. On the other hand, a large codebook that consists of many code words will result in an increased amount of downlink feedback overhead, since, in general, the NodeB needs to be able to signal all unique code words to the UE, and the number of bits required to signal all code words in a codebook of size K is $\log_2 K$.

In order to keep track of the fast variations of the wireless channel (e.g. fast fading) the pre-coding weights need to be updated frequently, typically on a per slot basis. A WCDMA channel with a structure that is suitable for carrying the pre-coding weight selection instructions, i.e. the code words mentioned above, is the fractional DPCH, the F-DPCH channel.

SUMMARY

It is an object of the invention to enable efficient signaling of instructions to an UE for its uplink transmissions from a WCDMA NodeB on a downlink channel with a structure similar to that of the WCDMA F-DPCH channel.

This object is obtained by means of a NodeB for a WCDMA system which is arranged to transmit instructions to a UE for the UE's uplink transmissions. The NodeB is arranged to transmit said instructions on a dedicated downlink physical channel which the NodeB is arranged to use for transmissions to a plurality of UEs. The dedicated downlink physical channel comprises a plurality of radio frames, and each radio frame comprises a number of slots, with each slot comprising a number of WCDMA symbols. The instructions to the UE comprise Transmit Power Commands, TPC commands, as well as other instructions to the UE for the UE's uplink transmissions. The NodeB is arranged to use a first WCDMA slot format for the TPC commands to the UE and a second WCDMA slot format for the other instructions to the UE.

In embodiments, the NodeB is arranged to transmit instructions to more than one UE in one and the same WCDMA symbol.

In embodiments, the NodeB is arranged to transmit the other instructions to a UE over several slots, using the second WCDMA slot format.

In embodiments, the NodeB is arranged to use the second WCDMA slot format with a frequency which varies according to the UE's speed of movement, so that the ratio between the number of slots with TPC and the other instructions vary adaptively with the UE's speed of movement.

In embodiments of the NodeB, the other instructions to a UE comprise instructions for uplink beam forming by the UE.

In embodiments of the NodeB, the other instructions to a UE comprise instructions on the number of MIMO streams to be used by the UE in uplink MIMO transmissions.

In embodiments of the NodeB, the dedicated downlink physical channel is the WCDMA F-DPCH channel.

The invention also discloses a UE for a WCDMA system, which is arranged to receive instructions from a NodeB for uplink transmissions. The UE is arranged to receive the instructions from the NodeB on a dedicated downlink physical channel which is used by the NodeB for transmissions to a plurality of UEs and which comprises a plurality of radio frames, with each radio frame comprising a number of slots, each slot comprising a number of WCDMA symbols. The UE is arranged to use a certain slot format to interpret a slot, and the instructions from the NodeB comprise Transmit Power Commands, TPC commands as well as other instructions for uplink transmissions. The UE is arranged to use a first WCDMA slot format to locate TPC commands and a second WCDMA slot format to locate the other instructions.

In embodiments, the UE is arranged to receive instructions which comprise a part of a WCDMA symbol.

In embodiments, the UE is arranged to receive the other instructions over several slots, using the second WCDMA slot format.

In embodiments of the UE, the other instructions from the NodeB comprise instructions for uplink beam forming by the UE.

In embodiments of the UE, the other instructions from the NodeB comprise instructions on the number of MIMO streams to be used by the UE in uplink MIMO transmissions.

In embodiments of the UE, the dedicated downlink physical channel is the WCDMA F-DPCH channel.

BRIEF DESCRIPTION OF THE DRAWINGS

The invention will be described in more detail in the following, with reference to the appended drawings, in which FIGS. 5 and 6 show examples of resource usage, and FIG. 7 shows different WCDMA slot formats.

DETAILED DESCRIPTION

Figure 1:
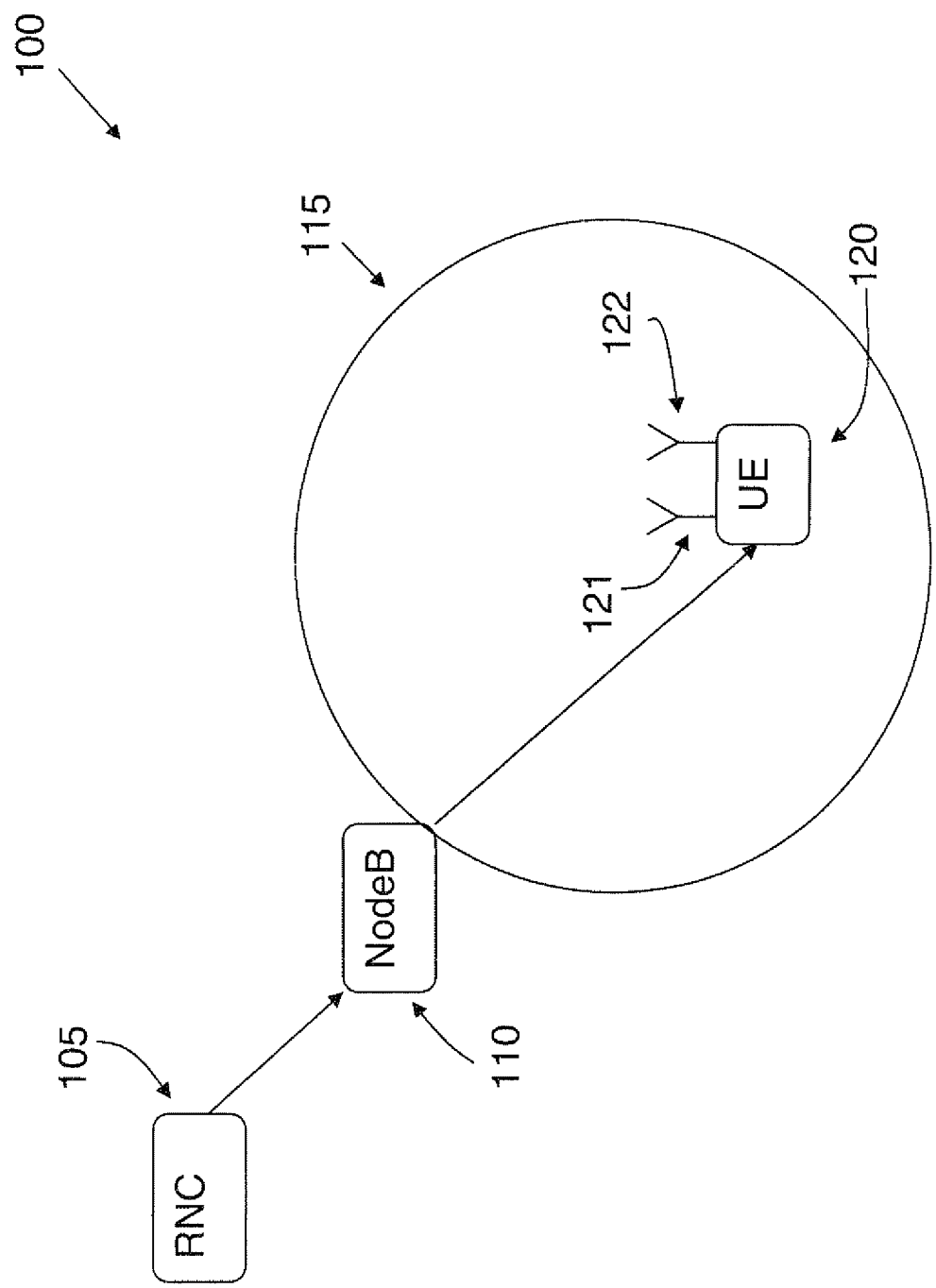
FIG. 1 shows an overview of a part of a WCDMA system.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

FIG. 1 shows a schematic overview of a part of a WCDMA system 100. The WCDMA system comprises a number of cells, one of which is shown as 115 in FIG. 1. Each cell can accommodate a number of User Equipments, UEs, one of which is shown as 120 in FIG. 1.

For each cell in the system, there will be a NodeB, shown as 115 in FIG. 1, as well as a Radio network Controller, an RNC, shown as 105 in FIG. 1.

As shown symbolically in FIG. 1, the UE 120 can be equipped with more than one transmit antenna. As an example, the UE 120 is equipped with two antennas, 121 and 122, although the number of antennas can also be greater than two. Usually, each antenna will be a combined receive and transmit antenna.

If a UE is equipped with two or more antennas, this fact can be exploited in a number of ways, for example by letting the UE perform so called beam forming in its uplink transmissions to the NodeB (as well as in its reception of transmissions from the NodeB), or for so called MIMO (Multiple Input Multiple Output) transmissions. A brief description will be given below of beam forming, since beam forming by the UE as instructed from the NodeB is one of the areas in which the invention can be used.

Figure 2:
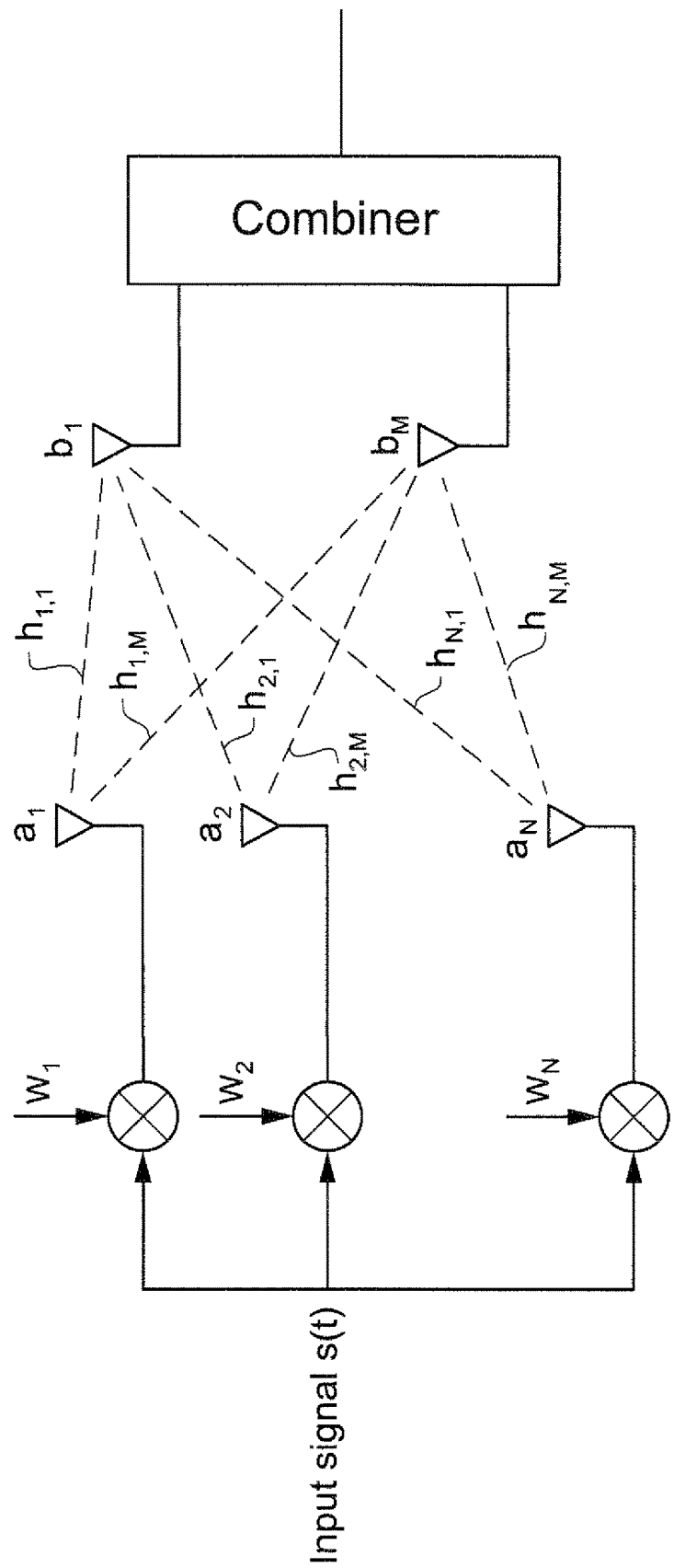
FIGS. 2 and 3 show examples of beam forming arrangements.

As touched upon previously in this text, beam forming comprises multiplying the transmit signal with a set of complex weight factors, where one weight factor is used for each antenna port. The term "antenna port" is used here rather than "antenna" or "physical antenna": in some embodiments, each antenna port corresponds to a separate physical transmit antenna. An example of beam forming in such an embodiment (i.e. each antenna port is a physical antenna) is shown in FIG. 2: N transmit antennas shown as $a_1$-$a_N$ are used to transmit a signal s(t). The signal s(t) is multiplied with a complex weight factor i=1-N, before reaching antenna $a_i$, which is done for each of the antennas $a_1$-$a_N$.

This can also be seen as using a weight vector w which comprises the weight factors $w_1$-$w_N$. The weight vector w is usually referred to as a pre-coding vector. If a corresponding vector y is used to refer to the signal which is transmitted from the N antenna ports, i.e. y=[$y_1$-$y_N$], then the transmission can be written as y=w*s.

As shown in FIG. 2, from each transmit antenna $a_k$ there is one stream received by each receiver antenna $b_1$, i.e. stream $h_{k,l}$ from transmit antenna $a_k$ is received by receiver antenna $b_l$, where k ranges from 1 to N and l ranges from 1 to M.

The transmitted signal y is received at the NodeB by M receive antennas, shown as $b_1$-$b_M$ in FIG. 2, and, as shown, the NodeB also comprises a combiner for constructing the signal s(t) properly from the signal y.

Figure 3:
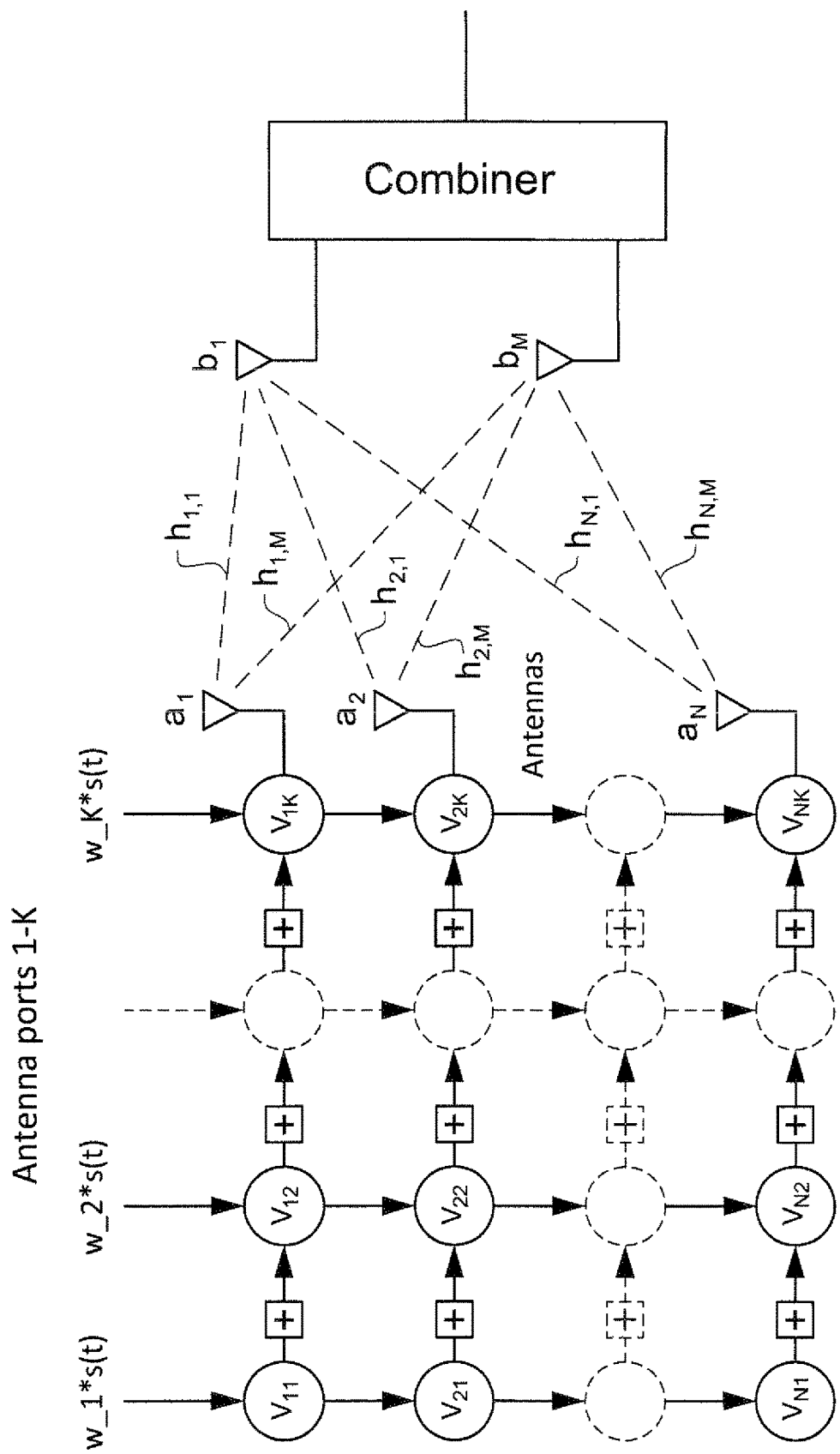

Thus, in the embodiment of FIG. 2, each antenna port corresponds to a separate physical transmit antenna. In other embodiments, one of which is shown in FIG. 3, an antenna port corresponds to a particular set of antenna weights for all or a subset of the transmit antennas. In such a case, different antenna ports correspond to different sets of antenna weights and a signal that is transmitted through one antenna port is transmitted through multiple antennas. FIG. 3 illustrates how K antenna ports are mapped to N transmit antennas by the use of antenna weights $v_{nk}$ where k and n denote the antenna port and transmit antenna index, respectively. As shown in FIG. 3, the input signal s(t) is pre-coded with weights w_1*s(t) to w_K*s(t) before being input to the respective antenna port 1-K.

The output signal from the antennas $a_1$-$a_N$ is in FIG. 3 shown as being received by M receiver antennas which are connected to a combiner similar to the one of FIG. 2.

As mentioned, in embodiments of the invention, beam forming instructions and/or MIMO instructions are conveyed from the NodeB to the UE. When it comes to the beam forming instructions which are conveyed, they are usually instructions regarding the pre-coding weights or, rather, on pre-coding vectors to be uses by the UE. The information is usually conveyed as so called code words, each of which identifies a pre-coding vector in a particular code book which has also been identified to the UE. As an example, the information would be conveyed as "code word x from code book y".

Figure 4:
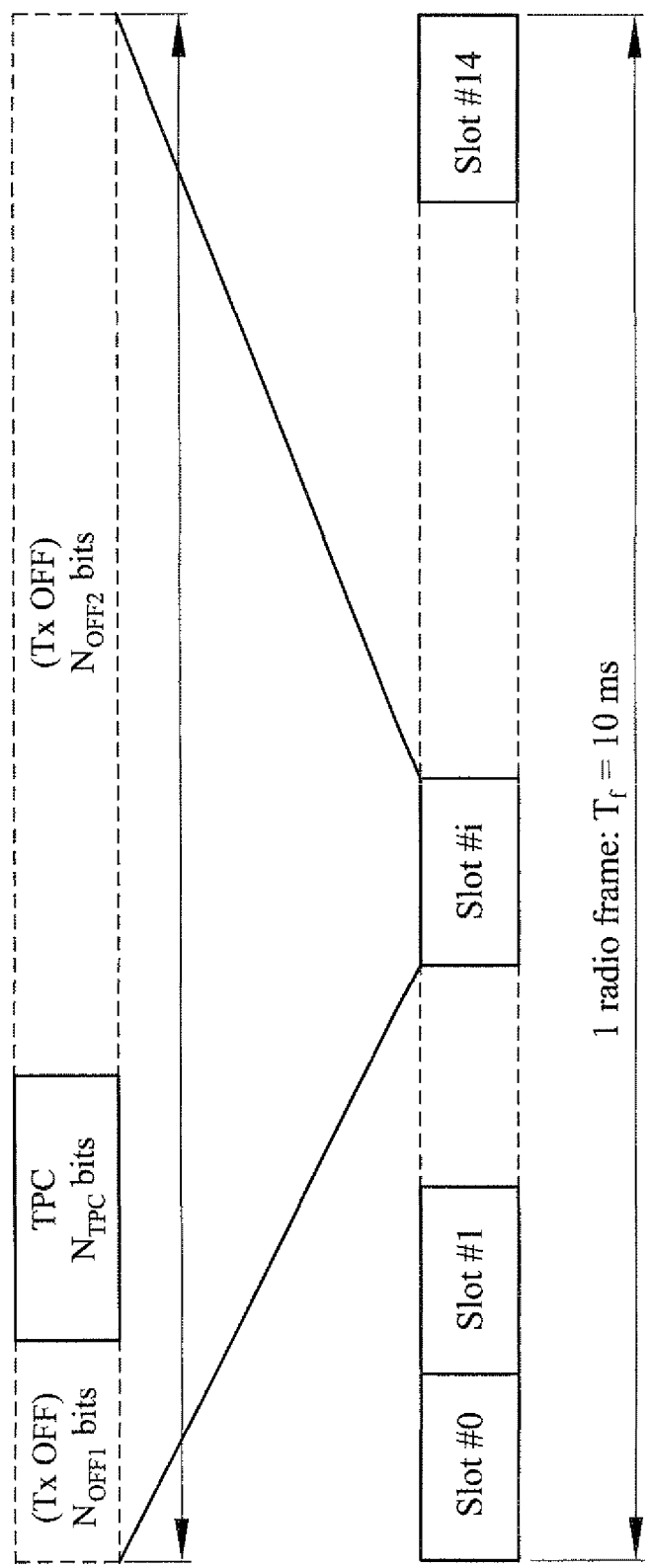
FIG. 4 shows a WCDMA frame structure.

A suitable channel structure offered for conveying beam forming instructions or MIMO instruction to UEs from the NodeB 110 is the channel structure offered by the WCDMA F-DPCH channel. One known use of the F-DPCH channel is to transmit TPC commands, i.e. Transmit Power Control commands, to the UEs. The F-DPCH channel uses spreading factor 256 and QPSK modulation, and has a frame structure which is shown in FIG. 4: frames with a length of 10 ms are split into 15 slots, where each slot consists of 2560 chips. Each slot contains 10 symbols, where each symbol consists of 2 bits. Every symbol corresponds to one TPC command, so that a symbol with bit sequence 11 represents TPC command UP and a symbol with bit sequence 00 represents TPC command DOWN. Consequently, every slot can carry up to 10 TPC commands, and one F-DPCH channel can accommodate up to 10 UEs.

In order for a UE to find "its" information in a slot, the F-DPCH uses so called slot formats which are numbered, a notion which will be explained in more detail later in this text, but in order to obtain proper operation, a UE and its NodeB need to know the slot format number for the UE The NodeB 110 of the invention is arranged to transmit instructions to a UE such as the UE 120 on the WCDMA F-DPCH channel or on a channel with the structure of the WCDMA F-DPCH channel for the UE's uplink transmissions. The term "the structure of the WCDMA F-DPCH channel" here refers to a channel which is a dedicated downlink physical channel which the NodeB is arranged to use for transmissions to a plurality of UEs and which comprises a plurality of radio frames, with each radio frame comprising a number of slots, each slot comprising a number of WCDMA symbols.

The instructions from the NodeB 110 to the UE 120 comprise TPC commands, as well as other instructions, such as beam forming instructions and/or MIMO instructions, to the UE 120 for the UE's uplink transmissions. Assume now that a certain number of bits in a slot are associated with the UE 120 by the NodeB 110: the NodeB 110 will then use two of those bits for the TPC commands to the UE 120 and the remaining bits for other instructions to the UE 120, such as, for example, beam forming instructions and/or MIMO instructions. This is done by means of simultaneously using multiple (two or more) F-DPCH slot formats to a UE, so that one slot format is used for transmitting the TPC commands to the UE and one or more other slot formats are used for transmitting the other instructions to the UE.

The NodeB 110 is also, in embodiments, arranged to transmit instructions to more than one UE in one and the same symbol, i.e. to transmit an uneven number of bits in a slot to the UE 120. In such a case, more than one UE could share information in one and the same F-DPCH symbol, so that the number of UEs sharing information in an F-DPCH symbol could, in fact, be equal to the number of bits in an F-DPCH symbol.

Thus, in embodiments, the NodeB 110 is arranged to let two or more UEs share information in one and the same F-DPCH symbol, and in some such embodiments to let a UE get an uneven number of bits larger where the uneven number is large than one, by means of transmitting instructions to one and the same UE using multiple WCDMA F-DPCH slot formats. For example, instructions to the UE 120 would be conveyed with slot formats 1, 2 and 3, where slot format 1 is used to carry TPC commands and slot formats 2 and 3 are used to carry beam forming and/or MIMO instructions, where slot format 2 is shared between the UE 120 and another UE. This could be implemented by letting the TPC bits in slot formats 2 and 3 be re-interpreted as beam forming and/or MIMO instructions.

Thus, a UE can use more than 2 slot formats for reception if more bits are needed for the instructions from the NodeB. With each additional slot format, two additional bits will become available for signaling the instructions. As mentioned above, there is also the possibility of sharing a symbol between UEs, so that one of the bits in the symbol is associated with one UE, and the other with another UE. Obviously, the more slot formats (more symbols) a specific UE is allocated, the fewer UEs can be multiplexed on a single F-DPCH, but in order to counter this, if needed, the network can configure more than one F-DPCH.

Regarding the exact details when it comes to mapping the instructions from the NodeB 110 to the UE 120 and other UEs to F-DPCH symbols in one slot, the NodeB 110 is, in embodiments, arranged to use one or more of the following principles:

Depending on how much beam forming/MIMO instructions that is needed (i.e. the number of bits), then, as mentioned, one or more F-DPCH slot formats can be allocated for a specific UE. Which bits or F-DPCH slot formats that would correspond to TPC commands and which bits or F-DPCH slot formats that would correspond to beam forming/MIMO instructions would then be conveyed to the UE (and the NodeB(s)) via Iub and RRC signaling upon configuration. A mechanism to keep track of the use of bits and/or slot formats is needed. As an example, assume that F-DPCH slot formats 1, 3 and 5 are allocated to the UE 120.

The TPC information to the UE 120 could then be associated with slot format 1, and beam forming/MIMO instructions would be associated with slot formats 3 and 5. In such a case, four bits become available to convey beam forming/MIMO instructions. Of the four bits, bit 1 and 2 could, as an example, be conveyed using slot format 3 and bits 3 and 4 could be conveyed using slot format 5.

In one embodiment where the NodeB uses multiple slot formats for one and the same UE, the NodeB 110 is arranged to always use a certain slot format number, for example the lowest slot format number, to convey TPC commands to the UE 120, whereas the remaining slot formats are used for conveying beam forming/MIMO instructions, where the significance of the bits depends on the slot format number. If one always allocates consecutive slot formats, this means that the NodeB 110 only needs to signal the first slot format number and the total number of slot formats.

To simplify the reception of the F-DPCH channel, it is beneficial for beam forming and/or MIMO capable UEs if the F-DPCH slot formats allocated to a particular UE are consecutive. UEs which are capable of beam forming and/or MIMO will moreover "consume" multiple F-DPCH slot formats, while "legacy" UEs (i.e. UEs not capable of beam forming or MIMO) will only consume a single F-DPCH slot format each.

Figure 5:
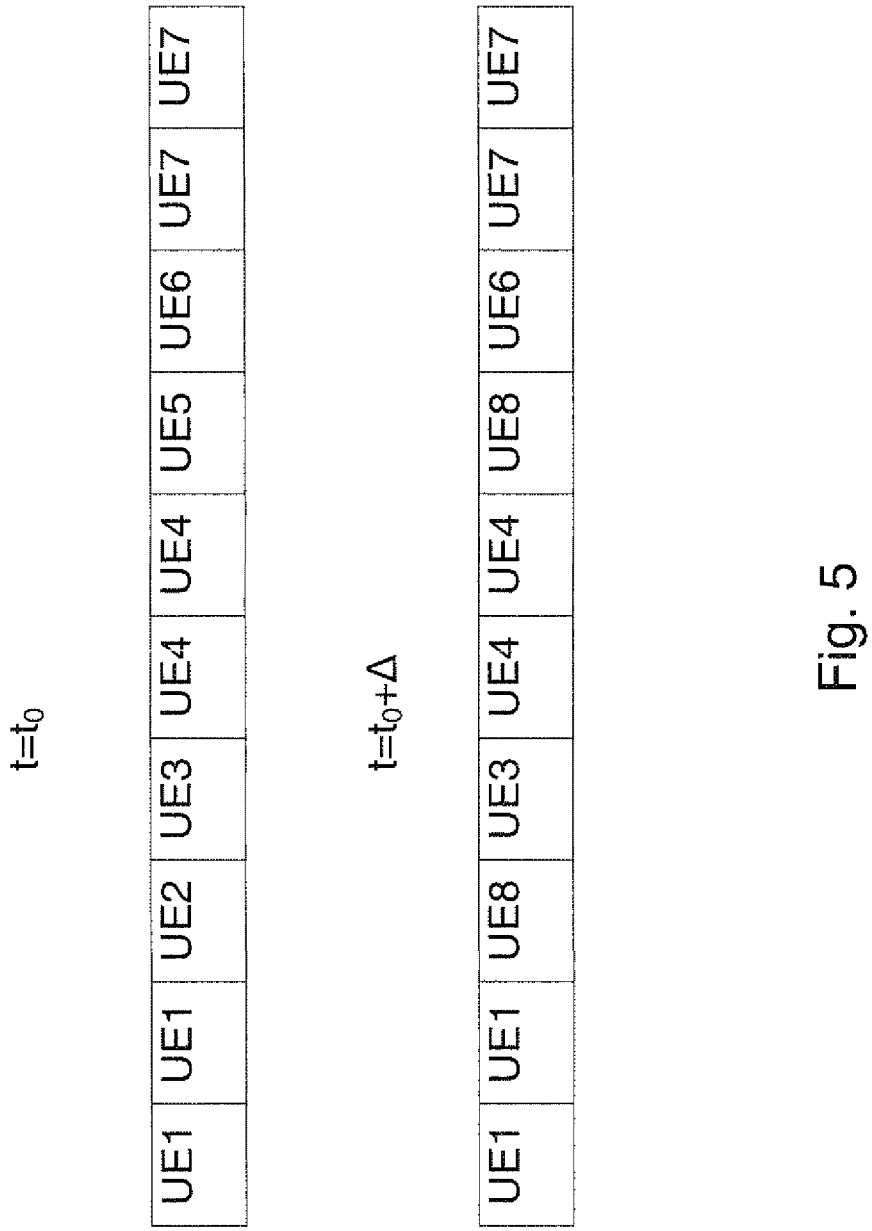

If the allocation of F-DPCH slot formats does not distinguish between UEs configured for beam forming and/or MIMO mode and legacy UEs, this can lead to F-DPCH resource fragmentation. This is illustrated in FIG. 5, which shows a sequence at times $t_0$ and $t_{0+\Delta}$: at time $t_0$, the slot formats are allocated consecutively to UEs, i.e. the first slot formats are allocated to UE1, then to UE 2 etc. At time $t_{0+\Delta}$, UEs 2 and 5 (which are legacy UEs, and thus only need one slot format each) have, in this example, left the system, and a new UE capable of beam forming and/or MIMO, UE8, has arrived in the system.

Since UE8 needs two slot formats, it is allocated the slot formats previously allocated to UEs 2 and 5, which leads to a fragmentation of the slot formats for UE 8. In order to avoid this resource fragmentation problem, the NodeB 110 is in embodiments arranged to allocate F-DPCH slot formats to beam forming/MIMO capable UEs in ascending order, starting with slot format 1, while "legacy" UEs instead are allocated F-DPCH slot formats in descending order. This is illustrated in FIG. 6, which shows that at time $t_0$, UEs 1, 4 and 7 (which are UEs capable of beam forming and/or MIMO) are allocated two slot formats each, starting from slot format 1, and "legacy" UEs 5, 6, 3 and 2 are allocated one slot format each. At time $t_{0+\Delta}$, the beam forming/MIMO capable UE 8 has arrived and legacy UEs UE2 and 5 have departed, and the UEs are now assigned their slot formats in the order mentioned, i.e. beam forming/MIMO capable UEs (i.e. UEs 1, 4, 7, 8) in ascending order, starting with slot format 1, while "legacy" UEs (i.e. UE 3 and 6) are instead allocated F-DPCH slot formats in descending order.

In embodiments, the NodeB is arranged to convey its instructions (TPC, beam forming/MIMO/etc) to an UE in a TDM (Time Division Multiplex) fashion using one (or several) F-DPCHs. In such embodiments, the NodeB lets the F-DPCH in some slots carry TPC commands, and in other slots the F-DPCH carries beam forming/MIMO related information. The ratio between the number of slots with TPC commands and the number of slots with beam forming/MIMO information can be fix, semi-static (RRC configured) or dynamic and decided by the Node-B For example, beam forming/MIMO information could be transmitted every xth slot, where x is equal or larger than 2, and in the rest of the slots, TPC commands are transmitted. Both the NodeB and the UE need to agree on the exact transmission pattern to use, i.e. which slots that carry TPC commands and which slots that carry beam forming/MIMO information.

Using one F-DPCH symbol (i.e. a certain slot format number) to carry the instructions from the NodeB 110 to the UE 120 means that there are two bits available for the instructions. If this is not enough, more symbols can be used, e.g. by allocating more slot formats to an UE, as described previously or by utilizing more than two of the twenty bits in a slot for TPC and/or MIMO information to a UE. In embodiments, bits are accumulated over several slots (still using one slot format) for beam forming/MIMO instructions. In such embodiments, only one slot format needs to be allocated per UE. Also, in such embodiments, the total number of bits to be conveyed to a UE for beam forming/MIMO instructions could be fixed (dependent on the codebook size), or it could vary depending on the likelihood of the code words being used. One variant of the latter approach is what is commonly referred to as Huffman coding, where likely events are coded using few bits and less likely events are coded using more bits. As an example of the approach with fixed number of bits, consider a case where the NodeB needs four bits to convey the beam forming/MIMO instructions and TPC commands are transmitted every second slot. This means that every fourth slot, the NodeB can update the beam forming/MIMO instruction, since the NodeB needs two slots to transmit the four bits of beam forming/MIMO instructions, and TPC information is transmitted every second slot.

In embodiments, the ratio between the number of slots with TPC and beam-forming feedback can vary dynamically. For example, a slowly moving UE (for example a stationary Laptop user) does not need updates of the TPC commands as often as a fast moving UE since the channel is changing slowly (i.e. "long coherence time"). Hence, for a slowly moving UE the NodeB 110 can use more slots to convey beam forming/MIMO instructions, and fewer slots for TPC commands. A fast moving UE, on the other hand, needs update of the TPC commands more often, and therefore many (or all) of the F-DPCH slots will have to carry TPC commands. However, for fast moving UEs, the potential gain from beam forming or MIMO is marginal anyways, due to the rapidly changing channel. The ratio between the number of slots with TPC and beam forming/MIMO used for a certain UE can therefore be varied depending on which "movement mode" the UE is in, e.g. whether the UE speed of movement is fast, slow or medium. This can be determined by either the NodeB or the UE by means of, for example, Doppler measurements. Which mode to use can be signaled by the NodeB, for example using HS-SCCH orders.

In embodiments, the NodeB can also combine the TDM operation described above with the "general" approach: The TDM operation described above can also be applied to the general approach described above. For example, the TPC commands using slot format A are always conveyed (every slot), while the beam forming related feedback conveyed using slot format B uses the TDM operation (which could depend on the mode, Huffman coding, etc, as described above). Slot format B could also be shared between users by TDM operation.

Up to this point, the beam forming instructions have mainly been mentioned in a general sense. Suitably, these instructions are standardized. In general, the number of bits needed to convey the beam forming information could be either fixed or dynamic, depending on the number of available codebooks and the number of code words in each codebook. For example, it would be possible to have one codebook for switched antenna operation (i.e. "use antenna 1 only" or "use antenna 2 only") using only 1 bit, and to have one or several codebooks for general beam forming operation, using e.g. 4 feedback bits to identify several code words in each code book.

In embodiments, the NodeB 110 is arranged to transmit more beam forming/MIMO related information in symbols by means of using higher order modulation. For example 16-QAM, 64-QAM or 8-PSK could be used. This can be applied in any of the above mentioned embodiments, in order to add additional instruction bits. The modulation order can depend on the present radio channel conditions, and can thus vary with the channel conditions, and could also vary depending on the codebook that is used. The modulation to be used can be signaled using HS-SCCH orders, or L2- or L3-signalling. One solution would be to map modulation constellation points that are close to each other to pre-coding vectors that are similar, so that errors in detection of the feedback symbol translates to only small errors in pre-coding weights.

One example of such higher order modulation is to use an 8-PSK (or BPSK, QPSK, 16-PSK, etc) symbol to indicate the phase for pre-coding, where phase adjustments are used. Then, if the constellation point right next to the correct one is detected, only a small phase error will be applied by the pre-coder. Another solution is to make the feedback symbol's phase and amplitude correspond directly to the relative or absolute phase and amplitude that the pre-coder should apply to one or more transmit antenna ports. Then the symbol would not necessarily need to correspond to a specific modulation constellation but could be freely constructed without phase and/or amplitude quantization.

FIG. 7 illustrates the notion of F-DPCH slot formats: each UE is associated with a certain slot format which tells the UE how to interpret the information in the slot. As an example, with reference to slot format 0 in FIG. 7, we see that slot format 0 tells the UE that the first two bits in the slot are to be interpreted as $N_{OFF1}$ bits, and the following two bits are TPC bits, with the remaining 16 bits being $N_{OFF2}$ bits. As shown in FIG. 7, there are 20 bits per F-DPCH slot in total.

A beam forming/MIMO capable UE which would need more than two bits to convey TPC information and other information would then need to be associated with more than two bits of an F-DPCH slot format. As discussed above, one solution would be to associate more than one slot format to such a UE, where one of these slot formats is used to carry TPC information and the rest of the slot formats are used to carry other instructions. The more bits that are needed for the other instructions, the more slot formats would be required since each additional slot format provides two more bits. Note also that as mentioned previously, a slot format can be shared between two UEs if an odd number of feedback bits are required.

Another solution is to introduce new slot formats which are tailored for carrying the other instructions. For example, one slot format could use only one of the slot's twenty bits bit for TPC/beam forming/MIMO, whereas another slot format could use three of the slot's twenty bits for TPC/beam forming/MIMO.

Figure 8:
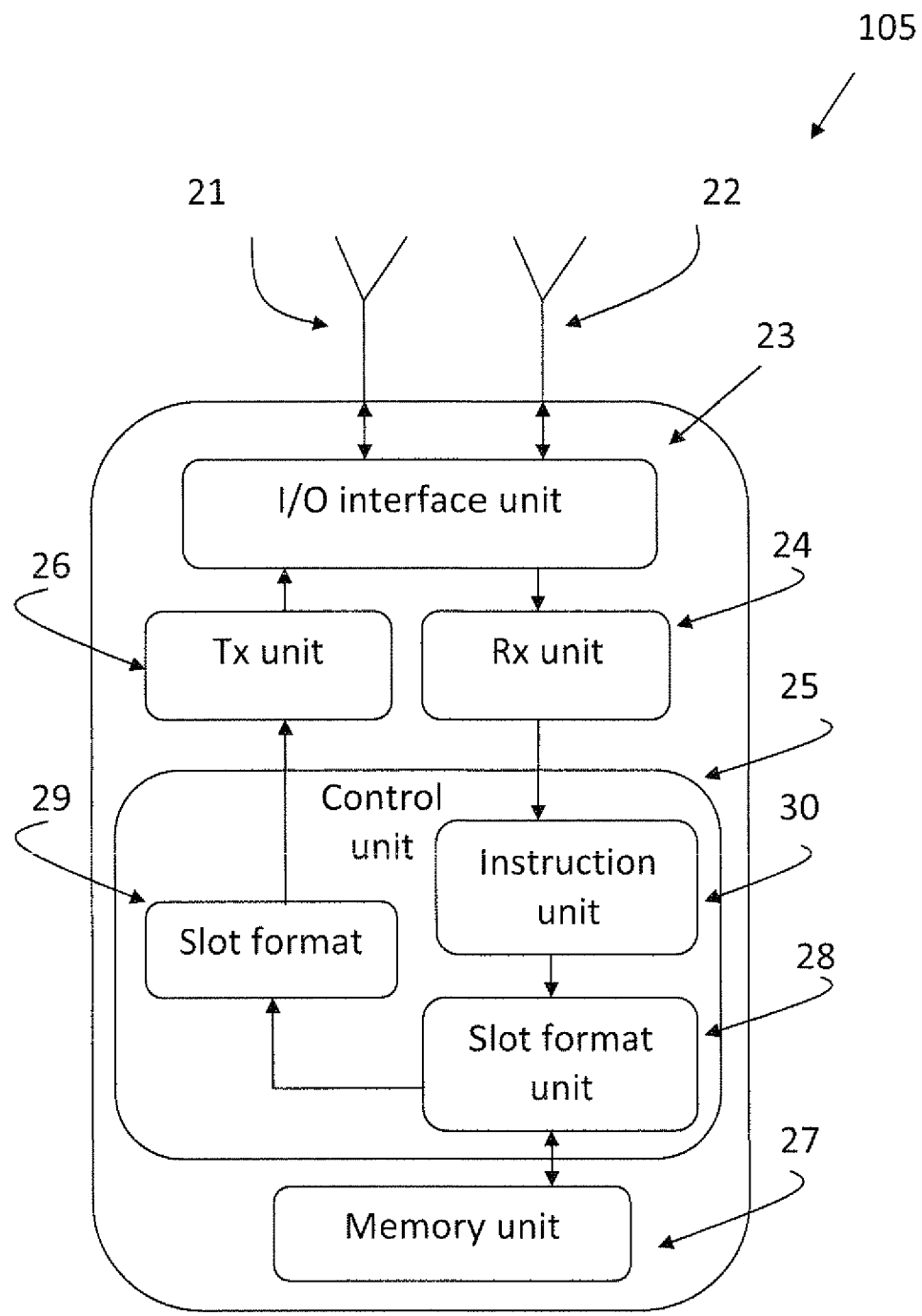
FIG. 8 shows a block diagram of a NodeB.

FIG. 8 shows an embodiment of a NodeB 110. The NodeB 110 is a NodeB for a WCDMA system, and is equipped with a first 21 and a second 22 antenna, both of which are suitably used for transmission and reception. It should be pointed out that although the UEs in the system are suitably equipped with more than one antenna, the NodeB doesn't need to have more than one antenna, although, if, for example MIMO operation is desired, two or more antennas at the NodeB will enhance the NodeB's operation.

In addition to the antennas 21 and 22, the NodeB 110 comprises an input and output interface unit, I/O interface unit 23, which handles the NodeB's interface towards, for example, UEs, via the antennas 21 and 22, as well, as for example, handling its interface towards other nodes in the WCDMA system, such as the RNC or other NodeBs. Such interfaces may be either radio interfaces or landline interfaces.

In addition, the NodeB 110 comprises a transmit unit, Tx Unit 26, and a Receive Unit, Rx Unit 24. The NodeB 110 also comprises a Control Unit 25, which receives transmissions from UEs via the I/O interface unit 23 and the Rx unit 24, and which also controls transmissions to UEs via the transmit unit 26 and the I/O interface unit 23.

The control unit 25 is also the unit which controls which slot format to use for transmissions to a UE, which is, for example, done in the following manner: suitably, the control unit 25 comprises an instruction unit 30, which assembles the instructions to the UEs. The instructions are used by a slot format unit 28 in order to check which slot format that should be used with the instructions, so that, for example, if the slot format unit 28 sees that the instructions are TPC commands, the slot format for such commands is chosen, and if the instructions are beam forming instructions, the slot format or formats for such commands is/are chosen.

Which slot format to use for a certain kind of instructions is for example retrieved from a memory unit 27, which has a table of instructions and their corresponding slot formats. The proper slot format and the instructions as such are then sent to a slot format unit 29 in the control unit 25, which formats the instructions properly, i.e. according to the proper slot format, and then sees to it that the slot as such is transmitted from the transmit unit 26.

Figure 9:
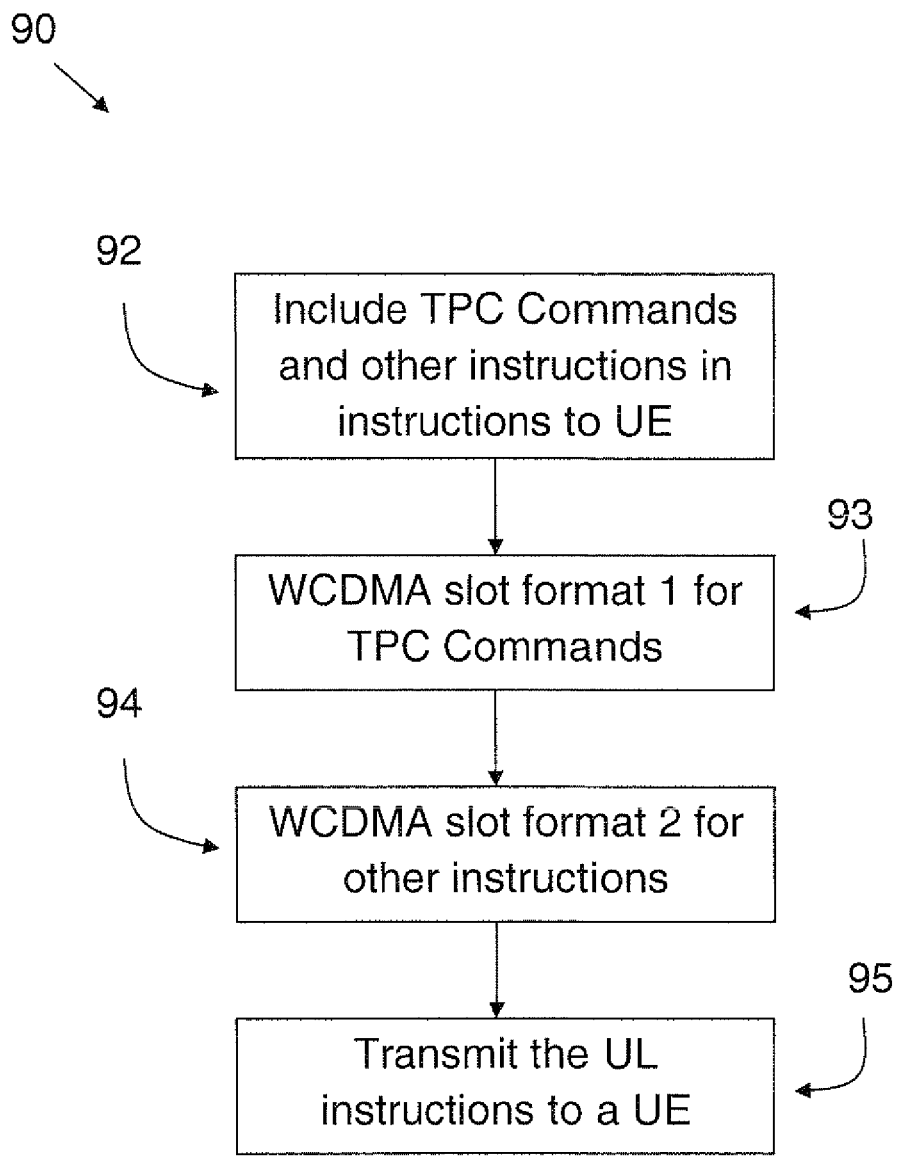
FIG. 9 shows a flow chart of a method for operating a NodeB.

FIG. 9 shows a flow chart of a method 90 for operating a NodeB such as the one 110, i.e. a NodeB for a WCDMA system. As indicated in step 95, the method 90 comprises transmitting instructions to a UE for the UE's uplink transmissions, and transmitting those instructions on a dedicated downlink physical channel which the NodeB is arranged to use for transmissions to a plurality of UEs and which comprises a plurality of radio frames, with each radio frame comprising a number of slots, each slot comprising a number of WCDMA symbols.

As indicated in step 92, the method 90 further comprises including in the instructions to the UE Transmit Power Commands, TPC commands as well as other instructions for the UE's uplink transmissions, and, as indicated in steps 93 and 94, the method 90 further comprises the use of a first WCDMA slot format for the TPC commands to the UE and a second WCDMA slot format for the other instructions to the UE.

In embodiments, the method 90 comprises transmitting instructions to more than one UE in one and the same WCDMA symbol.

In embodiments, the method 90 comprises transmitting the other instructions to a UE over several slots, using said second WCDMA slot format.

In embodiments, the method 90 comprises using the second WCDMA slot format with a frequency which varies according to the UE's speed of movement, so that the ratio between the number of slots with TPC and the other instructions is varied adaptively with the UE's speed of movement.

In embodiments, according to the method 90, the other instructions to a UE comprise instructions for uplink beam forming by the UE.

In embodiments, according to the method 90, the other instructions to a UE for the UE's uplink transmissions comprise instructions on the number of MIMO streams to be used by the UE in uplink MIMO transmissions.

Figure 10:
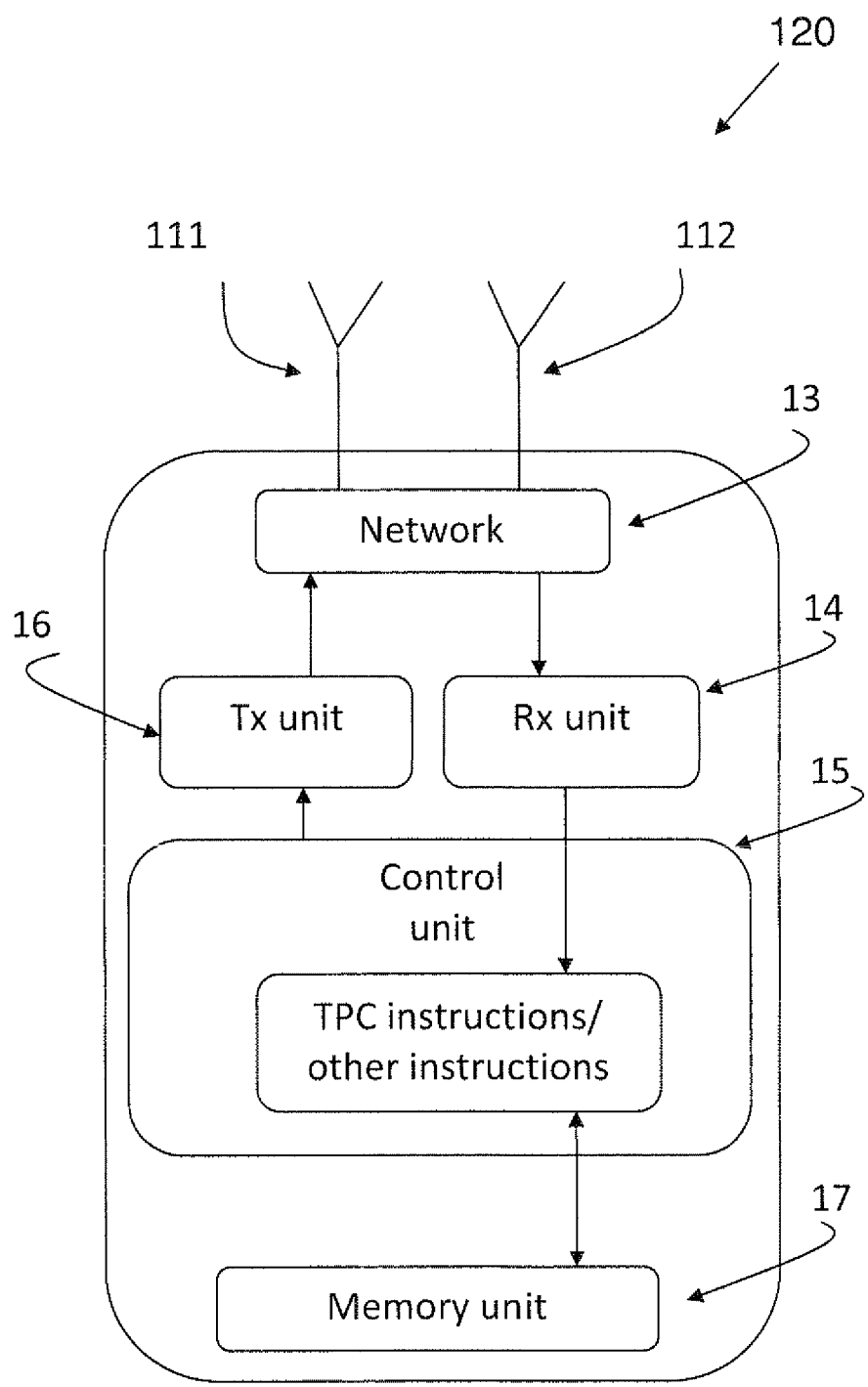
FIG. 10 shows a block diagram of a UE.

FIG. 10 shows an example of a block diagram of the UE 120: the UE 120 comprises, as was also shown in FIG. 1, two antennas 111 and 112, which are suitably both transmit and receive antennas. In addition, there is a transmit unit, Tx unit 16, and a Receive Unit, Rx Unit 14, which are connected to the two antennas via of an antenna network 13. The UE 120 also comprises a Control Unit 15 which receives transmissions from the NodeB via the antennas 111 and 112 and the Rx unit 14, and which also controls transmissions to the NodeB via the transmit unit 16 and the antennas 111 and 112.

The control unit 15 thus receives TPC instructions and other instructions from the NodeB, where the other instructions are, for example, instructions regarding beam forming or MIMO. When a slot is received, the control unit 15 addresses a memory unit 17 in order to find out if and how the slot should be interpreted, i.e. if the slot should be ignored or if it should be interpreted according to a certain slot format, and if the slot contains TPC commands or other instructions, e.g. MIMO or beam forming instructions.

Figure 11:
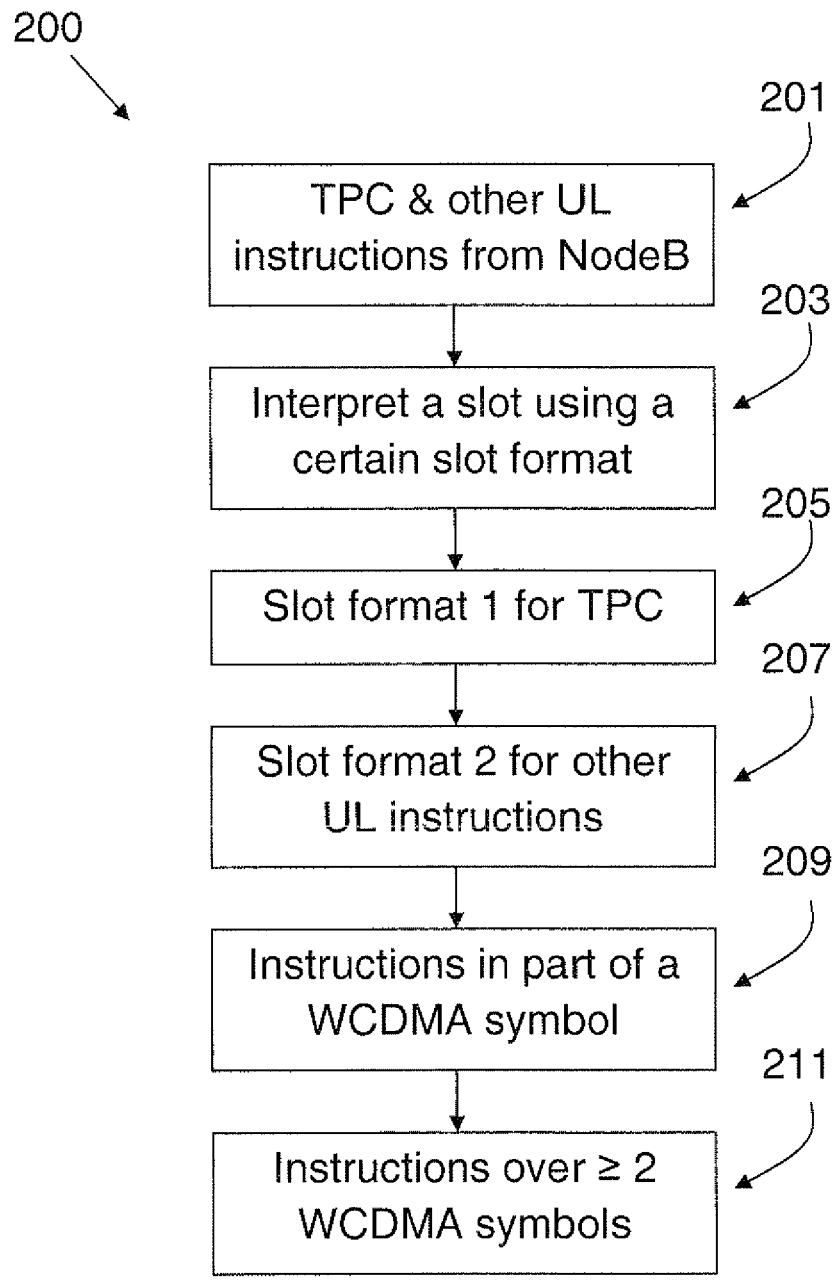
FIG. 11 shows a flow chart of a method for operating a NodeB.

FIG. 11 shows a flow chart of a method 200 for operating a UE such as the one 120, i.e. a UE for a WCDMA system. As indicated in step 201, the method 200 comprises receiving instructions from a NodeB for uplink transmissions, comprising Transmit Power Commands, TPC commands, as well as other instructions for uplink transmissions, and receiving the instructions on a dedicated downlink physical channel which is used by the NodeB for transmissions to a plurality of UEs and which comprises a plurality of radio frames, with each radio frame comprising a number of slots, each slot comprising a number of WCDMA symbols.

As indicated in step 203, the method 200 comprises using a certain slot format to interpret a received slot, and, as indicated in steps 205 and 207, the method 200 comprises using a first WCDMA slot format to locate TPC commands and a second WCDMA slot format to locate the other instructions.

In embodiments, as indicated in step 209, the method 200 comprises receiving instructions which comprise less than an entire WCDMA symbol.

In embodiments, as indicated in step 211, the method 200 comprises receiving said other instructions over several slots, using said second WCDMA slot format.

According to embodiments of the method 200, the other instructions from the NodeB comprise instructions for uplink beam forming by the UE.

According to embodiments of the method 200, the other instructions from the NodeB comprise instructions on the number of MIMO streams to be used by the UE in uplink MIMO transmissions.

In embodiments of the method 200, the dedicated downlink physical channel is the WCDMA F-DPCH channel.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

Embodiments of the invention are described with reference to the drawings, such as block diagrams and/or flowcharts. In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

The invention claimed is:

1. A NodeB for a WCDMA system, the NodeB being arranged to transmit instructions to a UE for the UEs uplink transmissions, the NodeB being arranged to transmit said instructions on a dedicated downlink physical channel which the NodeB is arranged to use for transmissions to a plurality of UEs and which comprises a plurality of radio frames, with each radio frame comprising a number of slots, each slot comprising a number of WCDMA symbols, the instructions to the UE comprising Transmit Power Commands, TPC commands as well as other instructions to the UE for the UE's uplink transmissions, the NodeB being arranged to simultaneously use a first WCDMA slot format for the TPC commands to the UE and a second WCDMA slot format for the other instructions to the UE, wherein the NodeB is further arranged to transmit instructions to more than one UE in one and the same WCDMA symbol.

2. The NodeB of claim 1, being arranged to transmit said other instructions to a UE over several slots, using said second WCDMA slot format.

3. The NodeB of claim 1, being arranged to use said second WCDMA slot format with a frequency which varies according to the UE's speedof movement, so that the ratio between the number of slots with TPC and said other instructions vary adaptively with the UE's speed of movement.

4. The NodeB of claim 1, in which the other instructions to a UE comprise instructions for uplink beam forming by the UE.

5. The NodeB of claim 1, in which the other instructions to a UE for the UE's uplink transmissions comprise instructions on the number of MIMO streams to be used by the UE in uplink MIMO transmissions.

6. The NodeB of claim 1, in which the dedicated downlink physical channel is the WCDMA F-DPCH channel.

7. A UE for a WCDMA system, the UE being arranged to receive instructions from a NodeB for uplink transmissions, the UE being arranged to receive said instructions on a dedicated downlink physical channel which is used by the NodeB for transmissions to a plurality of UEs and which comprises a plurality of radio frames, with each radio frame comprising a number of slots, each slot comprising a number of WCDMA symbols, the UE being arranged to use a certain slot format to interpret a slot, the instructions from the NodeB comprising Transmit Power Commands, TPC commands as well as other instructions for uplink transmissions, the UE being arranged to simultaneously use a first WCDMA slot format to locate TPC commands and a second WCDMA slot format to locate the other instructions, wherein the UE is further arranged to receive instructions which comprise a part of a WCDMA symbol.

8. The UE of claim 7, being arranged to receive said other instructions over several slots, using said second WCDMA slot format.

9. The UE of claim 7, in which the other instructions from the NodeB comprise instructions for uplink beam forming by the UE.

10. The UE of claim 7, in which the other instructions from the NodeB comprise instructions on the number of MIMO streams to be used by the UE in uplink MIMO transmissions.

11. The UE of claim 7, in which the dedicated downlink physical channel is the WCDMA F-DPCH channel.

12. A method for operating a NodeB for a WCDMA system, the method comprising transmitting instructions to a UE for the UE's uplink transmissions, and transmitting said instructions on a dedicated downlink physical channel which the NodeB is arranged to use for transmissions to a plurality of UEs and which comprises a plurality of radio frames, with each radio frame comprising a number of slots, each slot comprising a number of WCDMA symbols, the method further comprising including in the instructions to the UE Transmit Power Commands, TPC commands as well as other instructions for the UE's uplink transmissions, the method further comprising simultaneously using a first WCDMA slot foimat for the TPC commands to the UE and a second WCDMA slot format for the other instructions to the UE, the method further comprising transmitting instructions to more than one UE in one and the same WCDMA symbol.

13. The method of claim 12, comprising transmitting said other instructions to a UE over several slots, using said second WCDMA slot format.

14. The method of claim 12, comprising using said second WCDMA slot format with a frequency which varies according to the UE's speed of movement, so that the ratio between the number of slots with TPC and said other instructions is varied adaptively with the UE's speed of movement.

15. The method of claim 12, according to which the other instructions to a UE comprise instructions for uplink beam forming by the UE.

16. The method claim 12, according to which the other instructions to a UE for the UE's uplink transmissions comprise instructions on the number of MIMO streams to be used by the UE in uplink MIMO transmissions.

17. A method for operating a UE for a WCDMA system, comprising receiving instructions from a NodeB for uplink transmissions, the instructions comprising Transmit Power Commands, TPC commands as well as other instructions for uplink transmissions, and receiving the instructions on a dedicated downlink physical channel which is used by the NodeB for transmissions to a plurality of UEs and which comprises a plurality of radio frames, with each radio frame comprising a number of slots, each slot comprising a number of WCDMA symbols, the method comprising using a certain slot format to interpret a received slot, the method comprising simultaneously using a first WCDMA slot format to locate TPC commands and a second WCDMA slot format to locate the other instructions, the method further comprising receiving instructions which comprise less than an entire WCDMA symbol.

18. The method of claim 17, comprising receiving said other instructions over several slots, using said second WCDMA slot format.

19. The method of claim 17, according to which the other instructions from the NodeB comprise instructions for uplink beam forming by the UE.

20. The method of claim 17, according to which the other instructions from the NodeB comprise instructions on the number of MIMO streams to be used by the UE in uplink MIMO transmissions.

21. The method of claim 17, according to which the dedicated downlink physical channel is the WCDMA F-DPCH channel.

* * * * *